No. 697,707. Patented Apr. 15, 1902.
W. G. EATON & W. A. REED.
STOPPING OR STARTING DEVICE.
(Application filed Oct. 5, 1901.)
(No Model.) 4 Sheets—Sheet 1.

No. 697,707. Patented Apr. 15, 1902.
W. G. EATON & W. A. REED.
STOPPING OR STARTING DEVICE.
(Application filed Oct. 5, 1901.)

(No Model.) 4 Sheets—Sheet 3.

WITNESSES—
P. W. Pezzetti.
George Pezzetti.

INVENTORS
W. G. Eaton
W. A. Reed
By Wright Brown & Quinby
Attys.

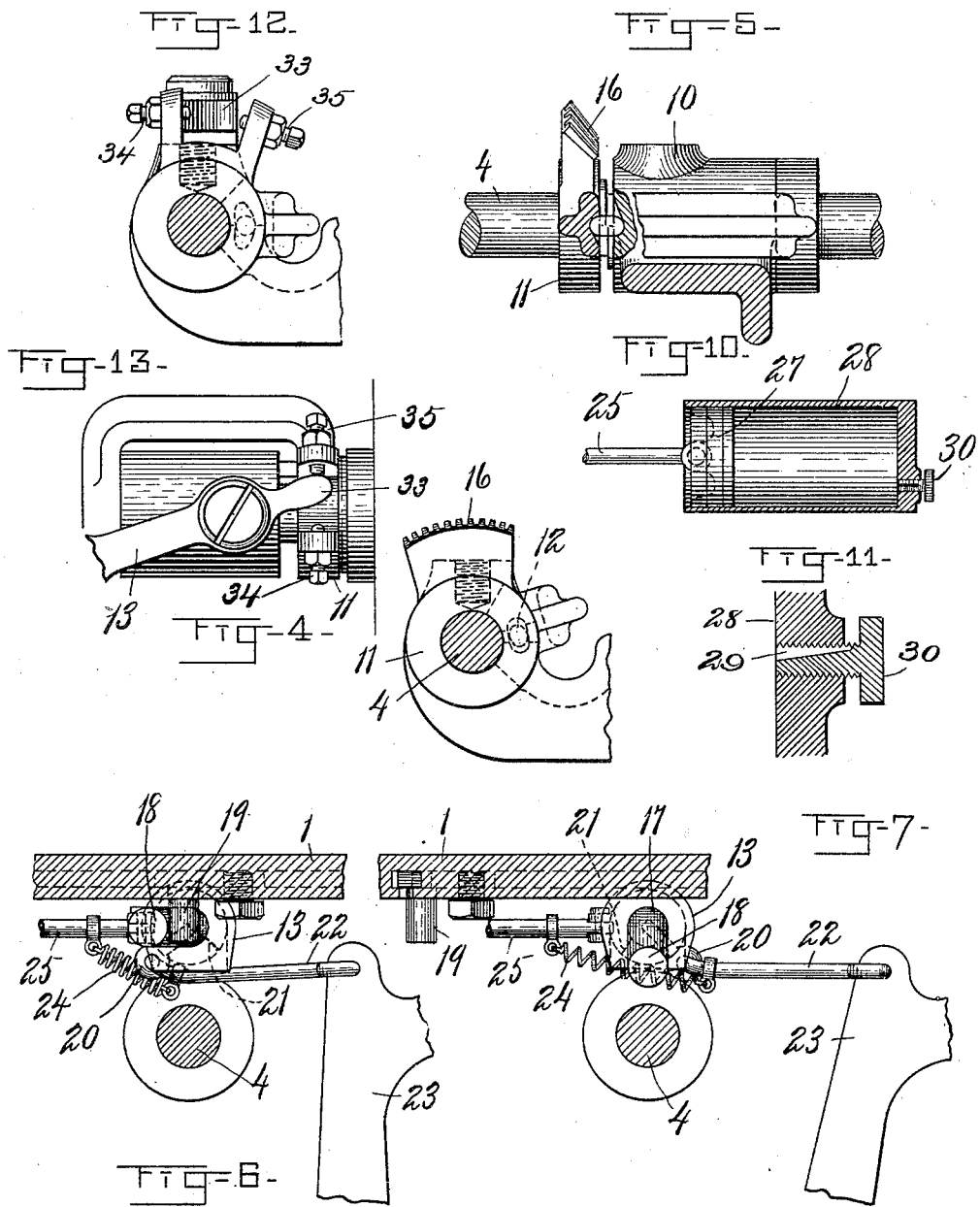

UNITED STATES PATENT OFFICE.

WILLIAM G. EATON AND WILLIAM A. REED, OF BOSTON, MASSACHUSETTS, ASSIGNORS TO FLAGG MANUFACTURING COMPANY, OF BOSTON, MASSACHUSETTS, A CORPORATION OF MAINE.

STOPPING OR STARTING DEVICE.

SPECIFICATION forming part of Letters Patent No. 697,707, dated April 15, 1902.

Application filed October 5, 1901. Serial No. 77,662. (No model.)

*To all whom it may concern:*

Be it known that we, WILLIAM G. EATON and WILLIAM A. REED, of Boston, in the county of Suffolk and State of Massachusetts, have invented certain new and useful Improvements in Stopping or Starting Devices, of which the following is a specification.

This invention relates to devices for starting and automatically stopping at the end of a predetermined cycle a driven member having considerable momentum, such as the table of a sole-rounding machine, and for permitting a certain amount of overthrow to the member, such as is desirable in sole-rounding machines in order to allow the rounding-knife to completely finish the cut around the sole. Heretofore in sole-rounding machines springs have been relied on to yieldingly arrest the table after the clutch has been thrown off; but it is found that springs suffer from the inherent objection of having as much rebound as there is compression imparted to them, which results in giving a greater rebound to the table than is desirable. It is extremely difficult with the use of a spring to keep the rebound within the desired limits and at the same time avoid an excessive shock when the table is stopped, and it is also difficult to furnish adjustments for a mechanism of this character using springs which shall permit the machine to work on both hard and easy stock without requiring a more faithful supervision on the part of operatives than is usually accorded.

Our invention has for its object to overcome the above difficulties, and to this end we provide an arresting device in which the rebound is less than the compressive force exerted by the table or other driven member and which will greatly reduce the shock attending the arrest of the driven member.

Figure 1:
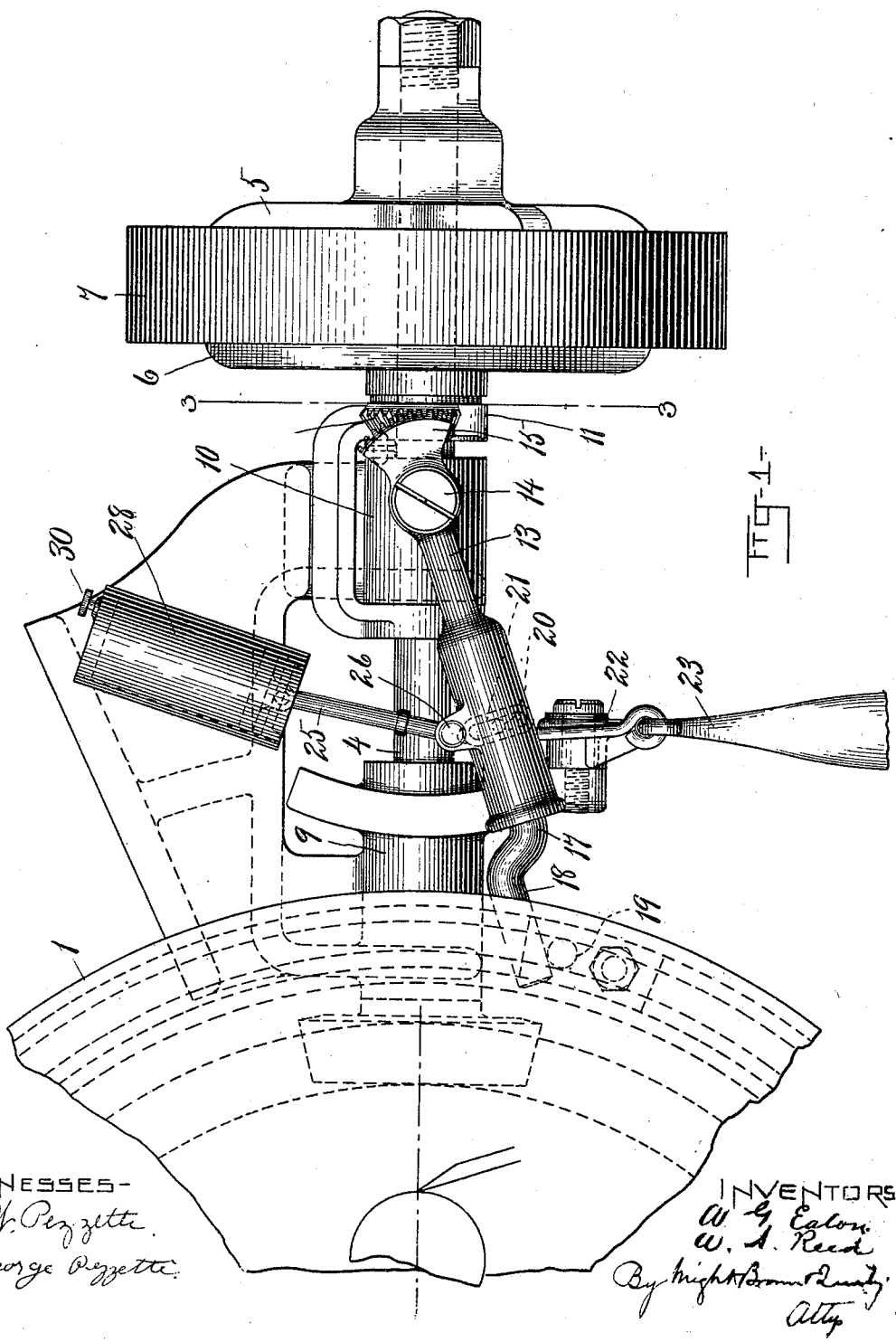
Figure 2:
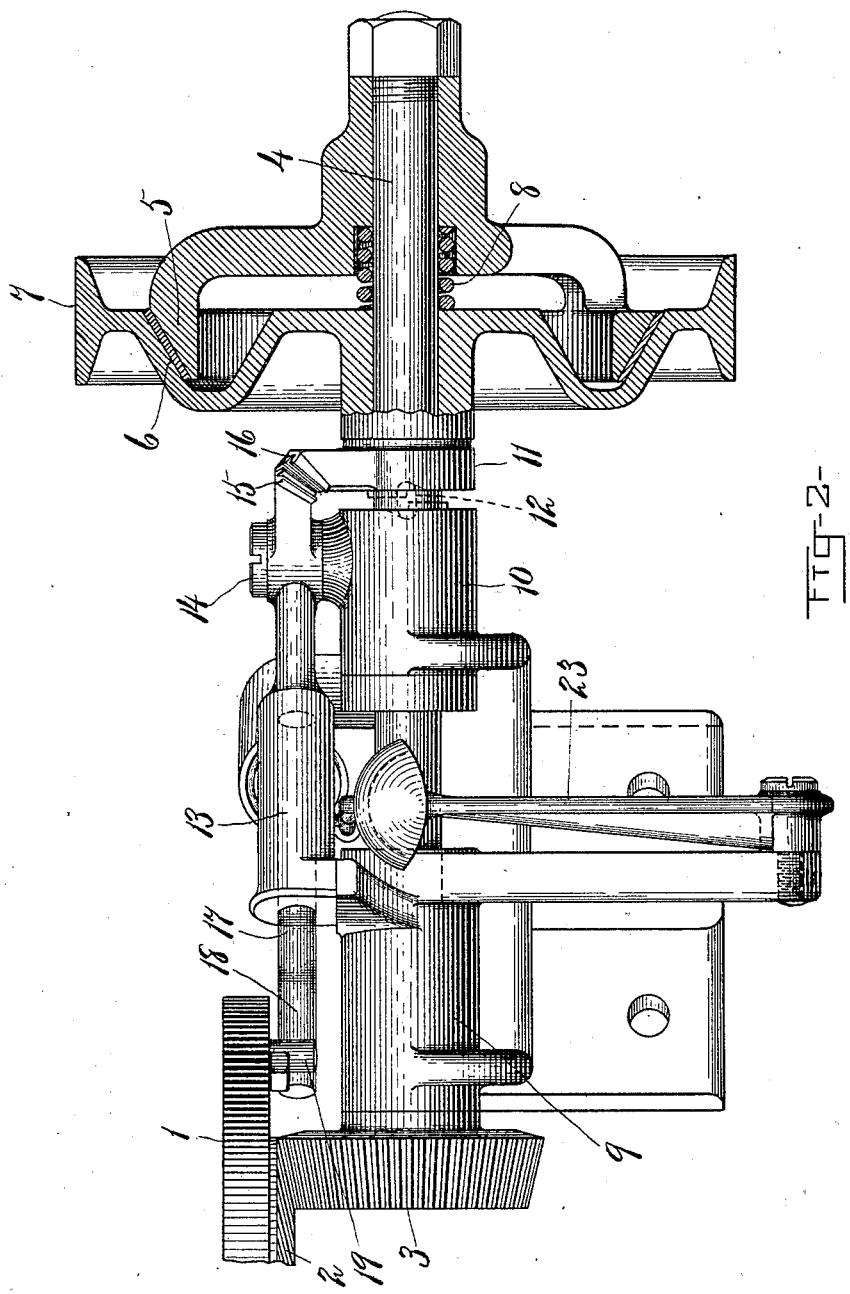
Figure 3:
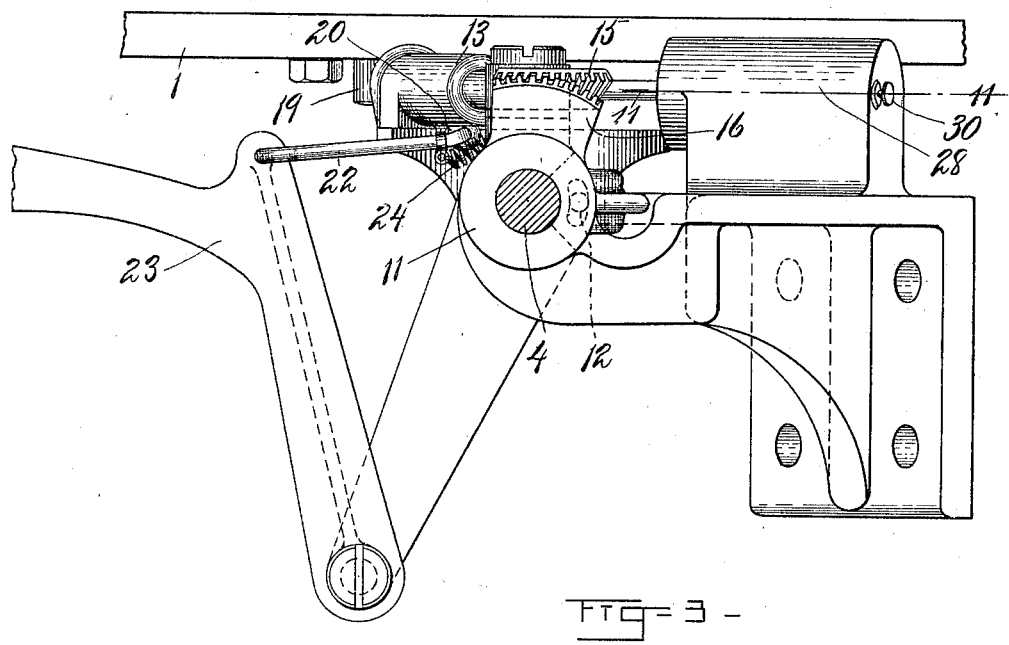
Figures 8, 9:
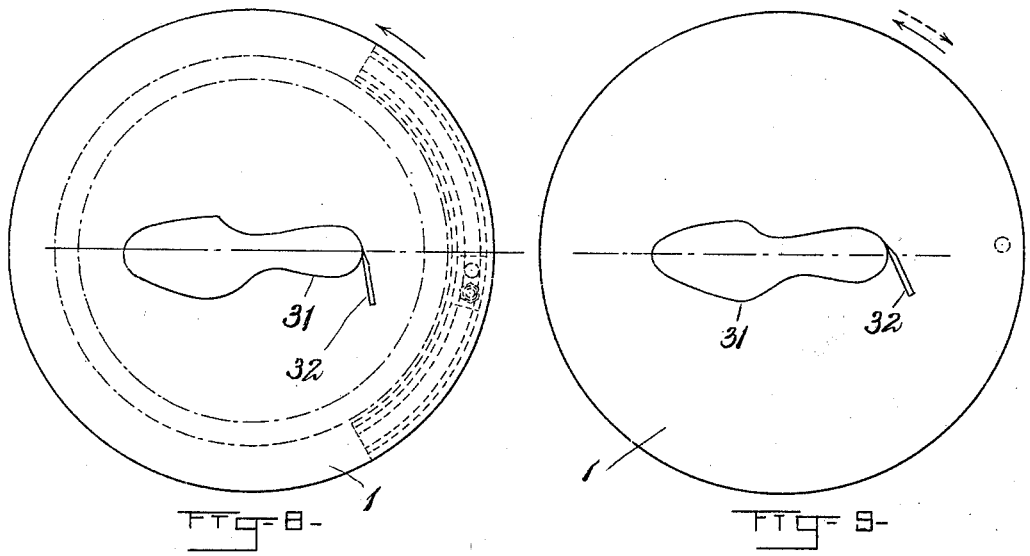

Of the accompanying drawings, forming a part of this specification, Figure 1 represents a plan view of a starting and stopping mechanism constructed in accordance with our invention as applied to the table of a sole-rounding machine. Fig. 2 represents a front elevation thereof, partly in section. Fig. 3 represents a section on the line 3 3 of Fig. 1. Fig. 4 represents a view of parts shown in Fig. 3, but in a different position. Fig. 5 represents a detail section showing the back of the clutch-operating mechanism. Figs. 6 and 7 represent detail sections of the table, showing the trip devices in two different positions. Figs. 8 and 9 represent plan views of the table, illustrating the overthrow of the knife. Fig. 10 represents an axial section through the dash-pot. Fig. 11 represents a detail section of the adjustable dash-pot vent. Figs. 12 and 13 represent, respectively, a section and a plan showing a modified form of connection between the trip-lever and the collar which operates the clutch.

The same reference characters indicate the same parts in all of the figures.

In the drawings, 1 represents the table of a sole-rounding machine, said table constituting the driven member and having a bevel-gear 2 on its under side, meshing with a bevel-pinion 3 on a shaft 4. 5 is a cone clutch member fast to said shaft, and 6 is a complemental cone clutch member formed on a belt-pulley 7, which is the driving member, loose on the shaft 4 and constantly rotated. A strong spring 8 tends to separate the clutch members by an axial movement of the pulley to the left, as viewed in Fig. 2.

9 10 represent the fixed bearings for the shaft 4.

The clutch is thrown on and off by the limited oscillation of a collar 11, between which and the bearing 10 is interposed a small strut 12, whose ends reside in notches in the bearing and collar, this being a familiar device in a well-known form of sole-rounder. When the strut lies substantially parallel to the shaft, the clutch will be set, and when it lies at an angle thereto the clutch is released. A limited oscillatory movement of the collar 11 about the shaft in one direction or the other suffices to set or release the clutch.

13 is a trip-lever whose oscillation sets and releases the clutch, said lever being pivoted at 14 to the bearing 10 and having a bevel-gear segment 15, meshing with a bevel-gear segment 16, formed on the collar 11. The trip-lever has a stem 17 mounted in it and provided with a portion 18, offset from its axis and adapted to be engaged by a pin or projection 19 on the table 1. The stem 17 also has a pin 20, projecting through a slot 21 in the wall of the lever 13 and connected by a link 22 with a pivoted operating handle or lever 23, the link being connected by a spring 24 to a piston-connecting rod 25, pivoted at 26 to the trip-lever 13. The spring normally holds the pin 20 against the rear end of the slot 21, in which position the offset portion 18 of stem 17 lies in the path of the pin 19. The slot permits of a certain amount of angular lost motion of the stem 17 during the initial movement of the operating-lever 23, whereby the offset portion 18 is swung out of the path of the pin 19. The connecting rod or link 25 is pivoted at its rear end to the piston 27 of a dash-pot having a cylinder 28, provided with a vent-aperture, which is formed by a taper groove 29, cut in the side of a screw 30, fitted to a threaded hole in the rear wall of the cylinder. An adjustable vent or relief is thus provided for the compression in the dash-pot.

The position of the parts before starting the apparatus in operation is with the trip-lever 13 swung over to the rear end of its stroke and the clutch released. To start the table, the lever 23 is drawn forward, which motion first rotates the stem 17 on its axis through substantially a quadrant and moves the offset portion 18 out of the path of the pin 19. This movement of the stem is terminated by the abutment of the pin 20 against the rear end of slot 21, and further movement of lever 23 then swings the trip-lever forward, as indicated in Fig. 3, to the position represented in Fig. 1, the piston 27 being drawn out to the front end of cylinder 28. The lever 13 transmits its motion through the bevel-gear segments 15 16 to the collar 11 and oscillates said collar, so as to set the clutch, and the table 1 is thereby started in rotation. When one rotation of the table is substantially completed, the parts have reached the positions represented in Fig. 1, in which the pin 19 is about to swing the trip-lever 13 by engaging the offset member 18. As the trip-lever is swung the piston 27 moves toward the rear end of the dash-pot cylinder and begins to compress the air in said cylinder, thereby offering a resistance to the further rotation of the table, which resistance becomes effective as soon as the oscillation of the collar 11 has released the clutch members 5 6. The momentum of the table is overcome by the compression of the air in the dash-pot, and said table is thereby arrested quietly and given a slight rebound in the opposite direction, the stroke of the trip-lever being such that the table is stopped at slightly more than a complete rotation, so as to give the rounding-knife a small amount of overthrow and permit it to fully complete the cut around the sole. This overthrow and rebound are represented diagrammatically in Figs. 8 and 9, in which 31 designates the stationary sole, and 32 the rounding-knife, the mountings of the knife and other portions of the machine being omitted. Fig. 8 shows the knife at the completion of a rotation of the table, and Fig. 9 shows the overthrow. The dotted arrow in Fig. 10 indicates the direction of rebound. The rebound of the table will not be as great as if a spring were used in place of the dash-pot 27 28, because during the compression in the dash-pot a portion of the compressed air, which portion is capable of being accurately regulated in amount by adjusting the screw 30, has escaped, so as to partly relieve said compression. The dash-pot therefore constitutes a device having provisions for arresting the table with a diminishing resilience.

With our invention the power may be left on until within a very short distance of the end of the cut, and yet the table will be stopped with hardly any shock. We thereby avoid the practice which has heretofore prevailed in operating sole-rounding machines of depending upon the momentum of the table after the clutch has been released for carrying the knife through the last end of the cut. With the old method of operating it was necessary to continually change the point at which the clutch was knocked off as the character of the material being operated on was changed; but with our present mechanism it is entirely feasible to maintain the same adjustment of the dash-pot vent throughout all conditions under which the machine is run. The adjustability of the vent is mainly provided in order to vary the cushioning action according to variations in the friction of the machine or of the dash-pot, which occur through continued use. Our invention is also an improvement over prior devices on account of its simple and uncostly construction.

Obviously various equivalent devices may be substituted in different parts of our mechanism without changing the character of the invention as a whole. For instance, it is permissible to use a different device than that shown for obtaining an adjustable vent to the dash-pot and also a different form of connection between the trip-lever and the clutch, as well as to change various other parts. Although an air or other gas dash-pot is our preferred instrumentality for arresting the driven member, we do not wholly confine ourselves to this, but may employ other known forms of dash-pots.

A modified form of connection between the trip-lever 13 and collar 11 is illustrated in Figs. 12 and 13, in which 33 represents a heel formed on the lever 13 and projecting into the space between two adjustable contact-screws 34 35, carried by ears formed on the collar 11. By this construction the lever may be permitted to have some lost motion with respect to the collar, and the point at which the clutch is thrown off with respect to the stroke of the trip-lever may be varied by adjusting the front screw 34.

We claim—

1. A machine of the character described comprising a rotatable member, driving means for rotating it, an arresting device adapted to stop the rotatable member with a diminishing resilience after the member has made a complete rotation and to then return said member to its starting-point, and means for automatically disconnecting the driving power from the rotatable member.

2. A machine of the character described comprising a rotatable member, driving means for rotating it said means including a clutch, an arresting device adapted to stop the rotatable member with a diminishing resilience at a point slightly beyond a complete rotation and to return it to its starting-point, and means for automatically disconnecting the clutch members during the operation of the arresting device.

3. A machine of the character described comprising a rotatable member, driving means for rotating it said means including a clutch, an arresting device adapted to stop the rotatable member with a diminishing resilience at a point slightly beyond a complete rotation and to return it to its starting-point, said device having means for varying the rate of diminution of said resilience, and means for automatically disconnecting the clutch members during the operation of the arresting device.

4. A constantly-actuated driver, a driven member, a clutch to connect and disconnect said driver from the driven member, a trip-lever connected to set and release the clutch, means acting on the trip-lever to yieldingly arrest the same, a projection on the driven member, a rotary stem carried by the trip-lever and having a member to be engaged by said projection and offset from the axis of rotation of the stem to avoid said projection upon rotation of the stem, a lost-motion connection between the stem and trip-lever, and an operating device connected with the stem.

In testimony whereof we have affixed our signatures in presence of two witnesses.

WILLIAM G. EATON.
WILLIAM A. REED.

Witnesses:
C. F. BROWN,
R. M. PIERSON.